(12) United States Patent
Task

(10) Patent No.: US 10,266,958 B2
(45) Date of Patent: Apr. 23, 2019

(54) HOT CORROSION-PROTECTED ARTICLES AND MANUFACTURE METHODS

(71) Applicant: United Technologies Corporation, Farmington, CT (US)

(72) Inventor: Michael N. Task, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 214 days.

(21) Appl. No.: 15/036,929

(22) PCT Filed: Oct. 28, 2014

(86) PCT No.: PCT/US2014/062554
§ 371 (c)(1),
(2) Date: May 16, 2016

(87) PCT Pub. No.: WO2015/099880
PCT Pub. Date: Jul. 2, 2015

(65) Prior Publication Data
US 2016/0289855 A1 Oct. 6, 2016

Related U.S. Application Data

(60) Provisional application No. 61/920,546, filed on Dec. 24, 2013.

(51) Int. Cl.
F02C 7/00 (2006.01)
C25D 5/14 (2006.01)
(Continued)

(52) U.S. Cl.
CPC ............... *C25D 5/14* (2013.01); *B32B 15/01* (2013.01); *C23C 18/1653* (2013.01);
(Continued)

(58) Field of Classification Search
CPC ..... C23C 18/1653; C23C 28/023; C25D 5/14; F01D 25/005; F01D 5/3092;
(Continued)

(56) References Cited

U.S. PATENT DOCUMENTS 3,625,039 A 12/1971 Kubach et al.
4,198,442 A * 4/1980 Gupta ................ C23C 4/02
148/425
(Continued)

FOREIGN PATENT DOCUMENTS

EP 1930467 A2 6/2008
WO 2013/037391 A1 3/2013

OTHER PUBLICATIONS

International Search Report and Written Opinion for PCT/US2014/062554, dated Feb. 16, 2015.
(Continued)

*Primary Examiner* — Jesse S Bogue
(74) *Attorney, Agent, or Firm* — Bachman & LaPointe, P.C.

(57) ABSTRACT

A coated article (22) comprises a substrate (100) and a coating system (102) atop the substrate. The coating system has a nickel-based first layer (104) and a chromium-based second layer (108) atop the first layer.

20 Claims, 3 Drawing Sheets

(51) Int. Cl.
  *C23C 28/02* (2006.01)
  *F01D 25/00* (2006.01)
  *B32B 15/01* (2006.01)
  *F01D 5/30* (2006.01)
  *C23C 18/16* (2006.01)

(52) U.S. Cl.
  CPC .......... *C23C 28/023* (2013.01); *F01D 5/3092* (2013.01); *F01D 25/005* (2013.01); *F05D 2230/22* (2013.01); *F05D 2230/25* (2013.01); *F05D 2230/90* (2013.01); *F05D 2300/132* (2013.01); *F05D 2300/175* (2013.01)

(58) Field of Classification Search
  CPC .............. F05D 2230/22; F05D 2230/25; F05D 2230/90; F05D 2300/132; F05D 2300/175; B32B 15/01
  See application file for complete search history.

(56) References Cited

U.S. PATENT DOCUMENTS

| | | | |
|---|---|---|---|
| 4,284,688 A * | 8/1981 | Stucheli | C23C 28/023 420/442 |
| 4,346,137 A | 8/1982 | Hecht | |
| 4,446,199 A | 5/1984 | Gedwill et al. | |
| 4,451,496 A * | 5/1984 | Gedwill | B32B 15/01 427/405 |
| 4,585,481 A | 4/1986 | Gupta et al. | |
| 4,615,865 A | 10/1986 | Duvall et al. | |
| 4,988,415 A * | 1/1991 | Martin | C23C 16/56 205/183 |
| 6,521,175 B1 | 2/2003 | Maurer et al. | |
| 6,532,657 B1 * | 3/2003 | Weimer | C23C 8/02 29/889.2 |
| 6,673,467 B2 | 1/2004 | Scarlin et al. | |
| 6,919,042 B2 | 7/2005 | Beers et al. | |
| 6,926,928 B2 * | 8/2005 | Ackerman | C23C 16/40 427/255.18 |
| 6,964,791 B2 * | 11/2005 | Zhao | C23C 26/00 427/250 |
| 7,205,053 B2 * | 4/2007 | Narita | C23C 28/321 416/241 B |
| 7,214,409 B1 | 5/2007 | Kasule | |
| 7,361,302 B2 | 4/2008 | Beers et al. | |
| 7,364,801 B1 | 4/2008 | Hazel et al. | |
| 7,476,450 B2 | 1/2009 | Maloney et al. | |
| 8,124,246 B2 | 2/2012 | Tolpygo | |
| 8,147,749 B2 * | 4/2012 | Reynolds | C22C 19/058 419/10 |
| 8,591,196 B2 * | 11/2013 | Hardwicke | C23C 30/00 416/229 A |
| 9,719,353 B2 * | 8/2017 | Bolcavage | C23C 28/023 |
| 2005/0058848 A1 | 3/2005 | Hodgens et al. | |
| 2005/0067273 A1 * | 3/2005 | Goodrich | B05D 5/068 204/192.15 |
| 2005/0118453 A1 | 6/2005 | Darolia | |
| 2008/0124542 A1 | 5/2008 | Hanlon | |
| 2008/0308425 A1 | 12/2008 | Mittendorf et al. | |
| 2009/0053069 A1 * | 2/2009 | Barnikel | C23C 4/02 416/241 R |
| 2010/0009092 A1 | 1/2010 | Tryon et al. | |
| 2013/0209265 A1 | 8/2013 | Reynolds et al. | |
| 2013/0209266 A1 | 8/2013 | Reynolds et al. | |
| 2013/0220819 A1 | 8/2013 | Hall et al. | |
| 2013/0341197 A1 * | 12/2013 | Piascik | C25D 5/12 205/176 |
| 2014/0147696 A1 * | 5/2014 | Bolcavage | C23C 28/02 428/632 |
| 2014/0342186 A1 * | 11/2014 | Bostanjoglo | B32B 15/01 428/678 |
| 2016/0024941 A1 * | 1/2016 | Kaiser | C23C 28/3215 428/633 |
| 2016/0214350 A1 * | 7/2016 | Larose | C23C 14/025 |

OTHER PUBLICATIONS

George A. Di Bari, Electrodeposition of Nickel, Modern Electroplating, Fifth Edition, Oct. 4, 2010, pp. 79-114, John Wiley & Sons, Inc., Hoboken, New Jersey.

European Search Report dated Jul. 14, 2017 for EP Patent Application No. 14874522.7.

* cited by examiner

HOT CORROSION-PROTECTED ARTICLES AND MANUFACTURE METHODS

CROSS REFERENCE TO RELATED APPLICATION

Benefit is claimed of U.S. Patent Application No. 61/920,546, filed Dec. 24, 2013, and entitled "Hot Corrosion-Protected Articles and Manufacture Methods", the disclosure of which is incorporated by reference herein in its entirety as if set forth at length.

BACKGROUND

The disclosure relates to gas turbines. More particularly, the disclosure relates to protective coatings for hot section components.

An exemplary gas turbine is discussed in the context of a gas turbine engine used for aircraft propulsion. Such an engine has a core gaspath passing sequentially through one or more compressor sections for compressing ingested air, a combustor section for combusting the compressed air and an introduced fuel to generate high pressure/temperature combustion gases, and one or more turbine sections for extracting work from the combustion gases to drive the compressor sections. With an exemplary turbofan engine, the turbine sections also drive a fan which, in turn drives air along a flowpath bypassing the core flowpath. Exemplary turbine sections are axial turbines wherein flow passes through one or more stages of rotating blades interspersed with stationary vanes or counter-rotating blades. The blades of a given stage may be unitarily formed with or mounted to the periphery of a disk. The disks of each section may be mounted to co-rotate with each other and any compressor section driven thereby. Exemplary compressor sections are also axial, although centrifugal compressors and turbines are also known.

Engine components (e.g., combustor panels, vanes, blades, disks, air seals, and the like) exposed to the combustion gases and heat are particularly subject to corrosion and erosion. Additionally, due to temperature increase with sequential stages of compression, the higher pressure portions of the compressor sections may be subject to significant operational heating.

A variety of substrate materials and protective coatings have been developed for these components. Exemplary substrate materials include a number of cast or powdermetallurgical (PM) forged nickel-based superalloys and/or cobalt-based superalloys. The centrifugal loading to which disks are exposed makes disks a particular area of concern for substrate materials.

U.S. Pat. No. 6,521,175 of Mourer, et al., issued Feb. 18, 2003, and entitled "Superalloy optimized for high-temperature performance in high-pressure turbine disks" discloses an advanced nickel-base superalloy for powder metallurgical (PM) manufacture of turbine disks. More recent alloys have been proposed in U.S. Pat. No. 8,147,749, of Reynolds, issued Apr. 3, 2012, and entitled "Superalloy compositions, articles, and methods of manufacture" and US Patent Application Publications 2013/0209265A1 and 2013/0209266A1, both of Reynolds, et al., published Aug. 15, 2013 and entitled "Superalloy Compositions, Articles, and Methods of Manufacture".

Thermal barrier coating (TBC) systems have been developed for hot section components. Typical such systems have one or more insulative ceramic layers (e.g., zirconia-based such as yttria-stabilized zirconia (YSZ) and/or gadolinia-stabilized zirconia (GSZ)). Such coatings may be used in combination with metallic bondcoats.

On disks and certain areas of certain other components, it may be impractical or unnecessary to apply a ceramic TBC. For example, at disk rims and portions inboard thereof temperatures may be sufficiently lower than directly in the gaspath (e.g., to which airfoils are exposed) that the insulative benefit of ceramic TBC may be traded for improved hot corrosion protection of a metallic coating system.

As gas turbine operating temperatures new engine designs continue to increase relative to their predecessors, high pressure compressor disks and high pressure turbine disks are entering into a temperature regime where deposit-induced hot corrosion (even in the absence of direct exposure to combustion gas) presents a substantial durability risk. While these components (or at least some relevant portions thereof) are not exposed to combustion gas (e.g., are not directly along the core gaspath and may be partially isolated therefrom by seals and the like), deposits can develop as a result of ingestion of particulate matter from the atmosphere. In addition, substantial concentrations of $SO_2$ gas, which is known to exacerbate hot corrosion attack, can be present in the atmosphere in certain regions of the world. Hot corrosion is most severe in geographic regions which have elevated levels of airborne particulate matter and gaseous pollution, man-made or otherwise.

There are also substantial problems when aircraft operate in coastal regions, because ingested sea salt can also result in severe hot corrosion attack. The polycrystalline Ni-base superalloys of typical turbine and compressor disks do not have sufficient hot corrosion resistance. Thus there is an increasing need for disks (and certain legacy components) to have hot corrosion-resistant coatings in order to meet life requirements. In addition to providing hot corrosion resistance, these coatings are advantageously designed such that debits to low cycle fatigue are minimal. This can be accomplished by developing coatings that are either ductile or only loosely adherent to the superalloy substrate.

U.S. Pat. No. 4,346,137, of Hecht, issued Aug. 24, 1982, and entitled "High temperature fatigue oxidation resistant coating on superalloy substrate" discloses an MCrAlY TBC bondcoat which may be used as underplatform blade coating without.

US Patent Application Publication 2010/0009092 A1, of Tryon et al., published Jan. 14, 2010 and entitled "Economic Oxidation and Fatigue Resistant Metallic Coating" discloses another MCrAlY TBC bondcoat.

U.S. Pat. No. 8,124,246, of Tolpygo, issued Feb. 28, 2012, and entitled "Coated Components and Methods of Fabricating Coated Components and Coated Turbine Disks" discloses use of sequential diffusion coating of chromium and noble metal on such a superalloy disk.

SUMMARY

One aspect of the disclosure involves a coated article comprising a substrate and a coating system atop the substrate. The coating system has a nickel-based first layer and a chromium-based second layer atop the first layer.

A further embodiment may additionally and/or alternatively include the substrate being a nickel-based superalloy.

A further embodiment may additionally and/or alternatively include the first layer being essentially pure nickel and the second layer is essentially pure chromium.

A further embodiment may additionally and/or alternatively include the substrate being a powder metallurgical substrate.

A further embodiment may additionally and/or alternatively include the coated article being a turbine engine disk.

A further embodiment may additionally and/or alternatively include the first layer having a characteristic thickness $T_1$ of 13 micrometers to 51 micrometers and the second layer having a characteristic thickness $T_2$ of 13 micrometers to 51 micrometers.

A further embodiment may additionally and/or alternatively include the coating system consisting of said first layer and said second layer.

A further embodiment may additionally and/or alternatively include the coating system lacking a ceramic layer.

A further embodiment may additionally and/or alternatively include a method for manufacturing the coated article. The method comprises: plating the first layer; and plating the second layer.

A further embodiment may additionally and/or alternatively include the first layer plating being electroplating.

A further embodiment may additionally and/or alternatively include the second layer plating being electroplating.

A further embodiment may additionally and/or alternatively include forming the substrate by forging of a powder metallurgical material.

A further embodiment may additionally and/or alternatively include a method for using the coated article. The method comprises: installing the article in a gas turbine engine; and running the gas turbine engine to heat the article.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
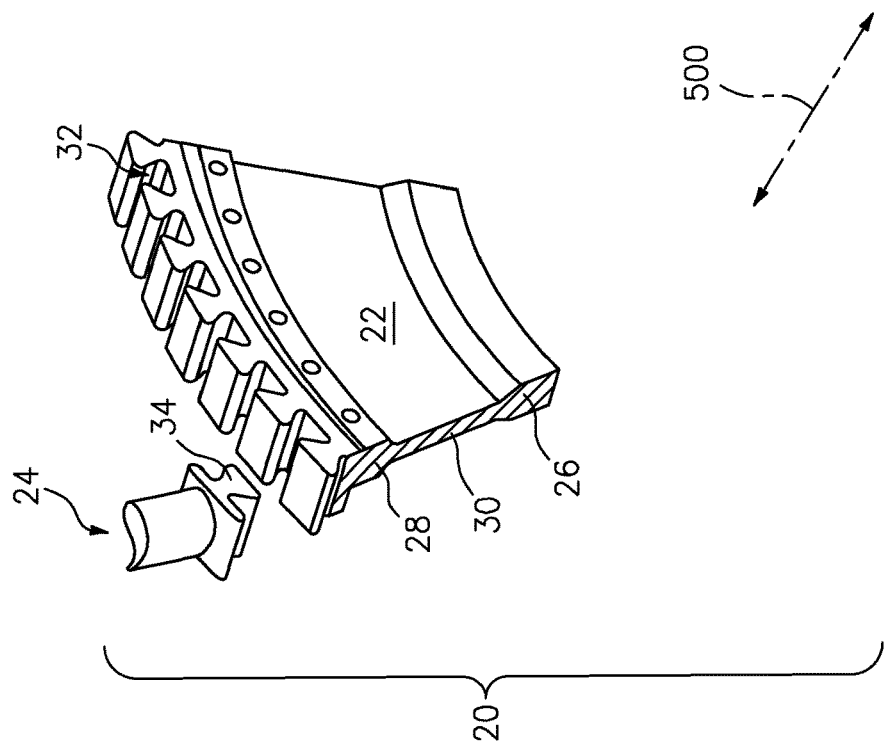
FIG. 1 is an exploded partial view of a gas turbine engine turbine disk assembly.

FIG. 1 shows a gas turbine engine disk assembly 20 including a disk 22 and a plurality of blades 24. The disk is generally annular, extending from an inboard bore or hub 26 at a central aperture to an outboard rim 28. A relatively thin web 30 is radially between the bore 26 and rim 28. The periphery of the rim 28 has a circumferential array of engagement features 32 (e.g., dovetail slots) for engaging complementary features 34 of the blades 24. In other embodiments, the disk and blades may be a unitary structure (e.g., so-called "integrally bladed" rotors or disks).

The disk 22 may be formed by a powder metallurgical forging process (e.g., as is disclosed in U.S. Pat. No. 6,521,175). In an exemplary process, the elemental components of the alloy are mixed (e.g., as individual components of refined purity or alloys thereof). The mixture is melted sufficiently to eliminate component segregation. The melted mixture is atomized to form droplets of molten metal. The atomized droplets are cooled to solidify into powder particles. The powder may be screened to restrict the ranges of powder particle sizes allowed. The powder is put into a container. The container of powder is consolidated in a multi-step process involving compression and heating. The resulting consolidated powder then has essentially the full density of the alloy without the chemical segregation typical of larger castings. A blank of the consolidated powder may be forged at appropriate temperatures and deformation constraints to provide a forging with the basic disk profile. The forging is then heat treated in a multi-step process involving high temperature heating followed by a rapid cooling process or quench. The quench for the heat treatment may also form strengthening precipitates (e.g., gamma prime and eta phases) of a desired distribution of sizes and desired volume percentages. Subsequent heat treatments are used to modify these distributions to produce the requisite mechanical properties of the manufactured forging. The increased grain size is associated with good high-temperature creep-resistance and decreased rate of crack growth during the service of the manufactured forging. The heat treated forging is then subject to machining of the final profile and the slots.

Figure 2:
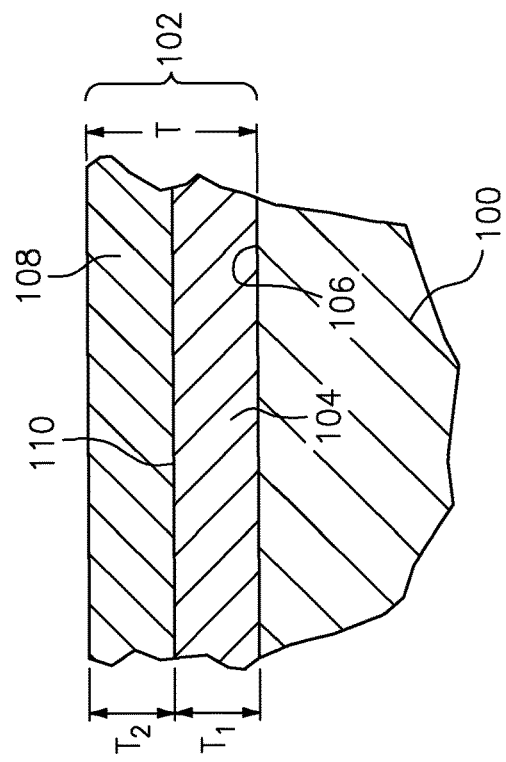
FIG. 2 is a schematic sectional view of a surface region of the disk showing a substrate and coating.

FIG. 2 schematically shows a section of the disk (e.g., along a rim portion such as an outer diameter (OD) surface or a front surface or a rear surface). The disk has a forged PM substrate 100 as discussed above. A coating system 102 lies atop the substrate and has an overall thickness T. The exemplary coating system comprises a lower or inner/inboard first layer 104 (e.g., atop a surface 106 of the substrate) and an upper or outer/outboard second layer 108 (e.g., atop a surface 110 of the first layer). The respective first and second layers have thicknesses $T_1$ and $T_2$. An exemplary surface 112 of the second layer is exposed and, thus, it does not bear any further coating layer (namely, a ceramic TBC).

Exemplary $T_1$ is 6.0 micrometers to 50 micrometers, more narrowly 6.0 micrometers to 25 micrometers or 6.0 micrometers to 15.0 micrometers. Exemplary $T_2$ is 6.0 micrometers to 50 micrometers, more narrowly 6.0 micrometers to 25 micrometers or 10.0 micrometers to 20.0 micrometers.

In operation, the second layer provides corrosion resistance. The second layer material is chromium-based (e.g., with chromium as a largest by-weight content, more particularly at least 50% chromium by weight, more particularly at least 80% and may consist essentially of chromium (e.g., offering equivalent performance to pure chromium and likely at least 95% chromium). With a second layer material that is relatively brittle, the first layer provides a relatively ductile interface with the substrate to prevent cracks in the second layer from propagating into the substrate. The first layer material is nickel-based (e.g., nickel as a largest by-weight component, more particularly at least 50% nickel by weight, more particularly at least 80%) and may consist essentially of nickel (e.g., offering equivalent performance to pure nickel and likely at least 95% nickel). As applied, one or both layers may be pure or relatively pure chromium and nickel, respectively but may be subject to some diffusion with each other or the substrate.

An exemplary process for depositing the first layer is plating (e.g., electroless or electroplating). This may be applied directly to the machined substrate to build to the thickness $T_1$.

An exemplary process for depositing the second layer is plating. Exemplary plating is electroplating. This may be applied directly to the first layer (e.g., after any washing) to build to the thickness $T_2$. Exemplary electroplating is disclosed in US Patent Application Publication 2013/0220819 entitled "Electrodeposition of Chromium from Trivalent Chromium Using Modulated Electric Fields", the disclosure of which is incorporated by reference in its entirety herein as if set forth at length. Such use of a trivalent chromium bath avoids toxicity concerns of hexavalent chromium.

Figure 3:
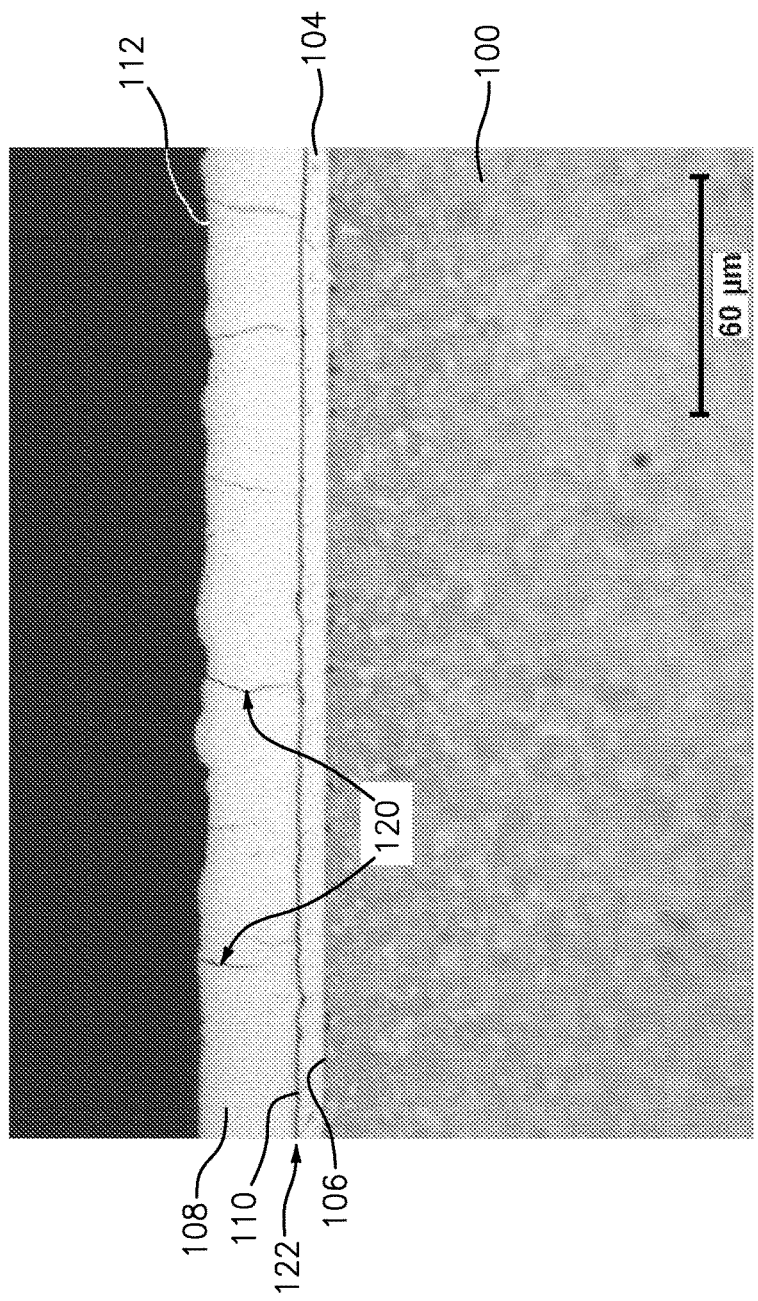
FIG. 3 is a photomicrograph of a section of the substrate and coating.
Figure 4:
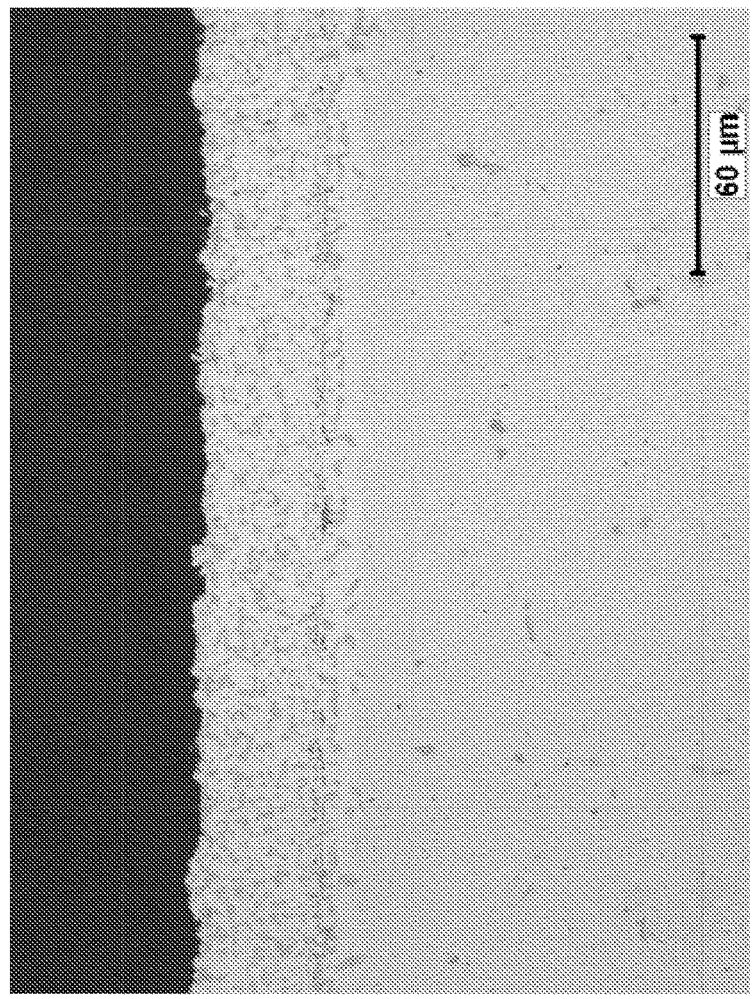
FIG. 4 is a photomicrograph of a section of a substrate and a prior art MCrAlY overlay coating.

FIG. 3 is a micrograph of an exemplary such two layer coating system 102. The lower layer 104 is directly atop the substrate and is thinner than the upper layer 104 (e.g. about 15% to 33% of the upper layer thickness). For comparison, FIG. 4 shows a baseline MCrAlY. Several things appear. First, it is seen that cracks 120 in the upper layer 108 normal to the surface (outer surfaces 106, 110, and 112 of the substrate and respective layers) have not propagated into the lower layer 104. The lower layer ductility, is believed to help avoid such crack propagation. In operation, these cracks 120 may effectively seal up with a protective $Cr_2O_3$ scale during exposure which may add to robustness and protection.

Second, a dark boundary 122 is seen between the two layers. This is a very thin gap that appears to have been created during the sectioning/mounting process for generating the micrograph. Also, it is seen that, compared to the MCrAlY, there is a lower degree of apparent interdiffusion with the substrate. Finally, it is seen that, compared to the MCrAlY, there is a lower degree of apparent surface roughness of the exposed coating surface.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A coated article comprising: a nickel-based superalloy substrate; and
   a coating system atop the substrate and comprising:
      a nickel-based first layer, by weight at least 80% nickel; and
      a chromium-based metallic second layer, by weight at least 80% chromium, directly atop the first layer and having an exposed surface and being thicker than the first layer.

2. The coated article of claim 1 being a turbine engine disk.

3. The coated article of claim 1 wherein: the coating system lacks a ceramic layer.

4. A method for manufacturing the coated article of claim 1, the method comprising:
   plating the first layer;
   and plating the second layer.

5. The method of claim 4 wherein:
   the first layer plating is electroplating.

6. The method of claim 4 wherein: the second layer plating is electroplating.

7. The method of claim 4 further comprising:
   forming the substrate by forging of a powder metallurgical material.

8. The method of claim 4 wherein:
   the coating system consists of said first layer and said second layer.

9. A method for using the coated article of claim 1, the method comprising: installing the article in a gas turbine engine; and
   running the gas turbine engine to heat the article.

10. A method for manufacturing a coated article, the article comprising: a nickel-base superalloy substrate; and
    a coating system atop the substrate and comprising: a nickel-based first layer; and
       a chromium-based second layer atop the first layer, the method comprising:
    plating nickel as by weight at least 80% nickel;
    plating chromium as by weight at least 80% chromium directly to the plated nickel; and with a surface of the chromium exposed, heating.

11. The method of claim 10 further comprising: forming the substrate by forging of a powder metallurgical material.

12. The method of claim 10 wherein: the first layer plating is electroplating.

13. The method of claim 10 wherein: the second layer plating is electroplating.

14. The method of claim 10 wherein:
    the first layer has a characteristic thickness of 13 micrometers to 51 micrometers; and the second layer is thicker than the first layer and is directly atop the first layer.

15. A coated article comprising: a nickel-based superalloy substrate; and
    a coating system atop the substrate and comprising:
       a nickel-based first layer, by weight at least 80% nickel; and
       a chromium-based metallic second layer, by weight at least 80% chromium, directly atop the first layer, the first layer having a thickness of 15% to 33% of a thickness of the second layer.

16. A method for using the coated article of claim 15, the method comprising:
    installing the article in a gas turbine engine; and
    with the second layer having an exposed surface, running the gas turbine engine to heat the article.

17. A coated article comprising:
    a nickel-based superalloy substrate; and
    a coating system atop the substrate and comprising:
    a nickel-based first layer of at least 80% nickel by weight and having a characteristic thickness T1 of 6 micrometers to 50 micrometers; and a chromium-based metallic second layer of at least 80% chromium by weight atop the first layer and having an exposed surface and being thicker than the first layer.

18. The coated article of claim 17 being a turbine engine disk.

19. A method for manufacturing a coated article, the article comprising: a nickel-base superalloy substrate; and
    a coating system atop the substrate and comprising:
       a nickel-based first layer having a characteristic thickness T1 of 6 micrometers to 50 micrometers; and
       a chromium-based second layer atop the first layer, the second layer having an exposed surface and being thicker than the first layer,
    the method comprising:
    plating nickel as by weight at least 80% nickel;
    plating chromium as by weight at least 80% chromium; and with a surface of the chromium exposed, heating.

20. The method of claim 19 wherein: the coated article is a turbine engine disk.

* * * * *